April 21, 1970     I. J. LANKFORD     3,507,259
REMOTE STARTER FOR AUTOMOTIVE VEHICLES
Filed Aug. 5, 1968
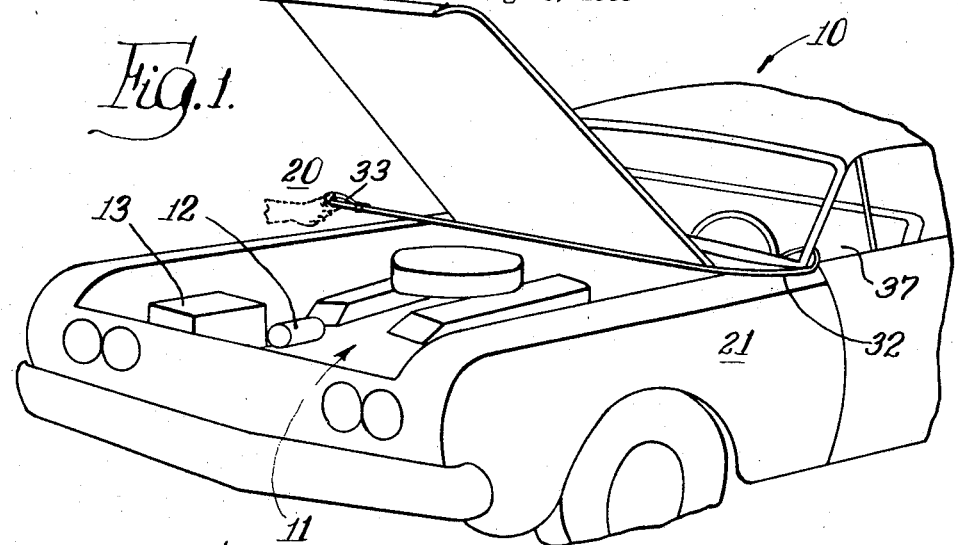
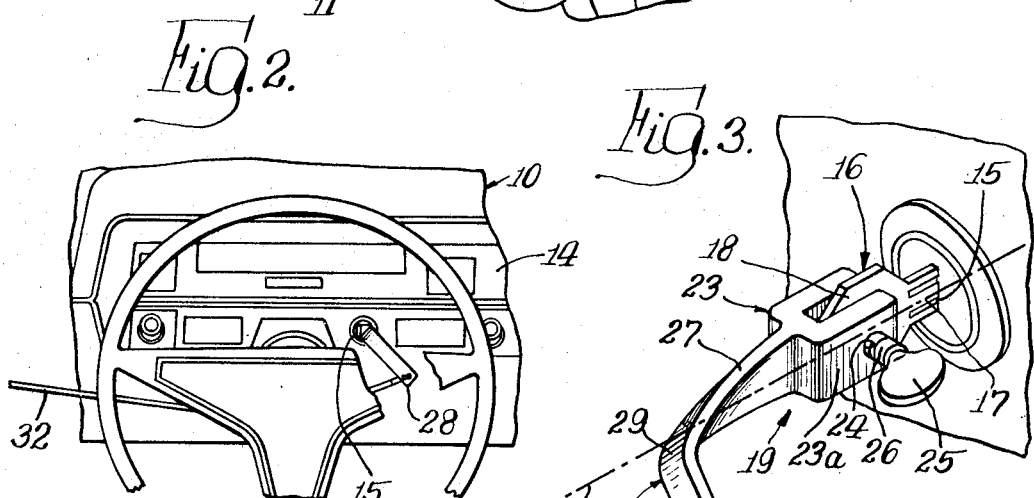
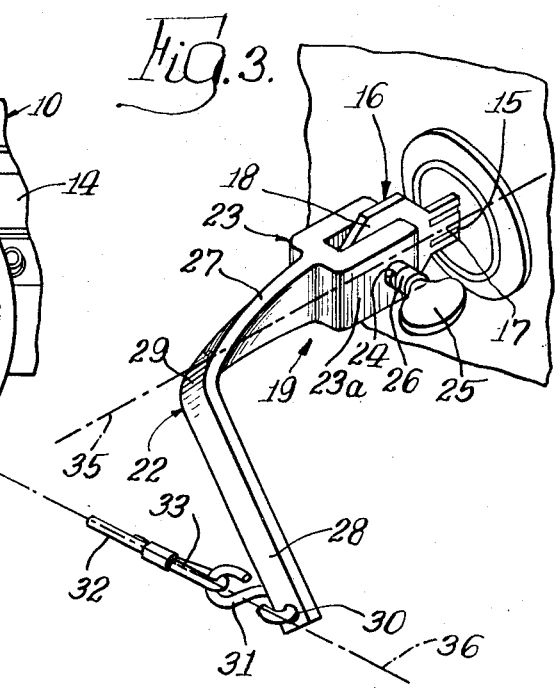
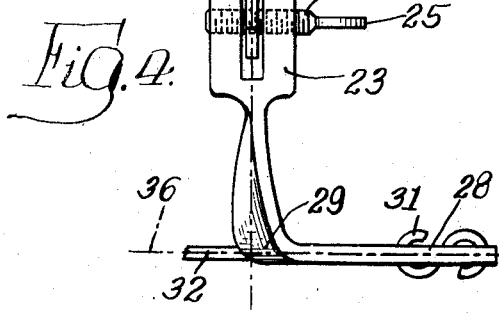
Inventor:—
Ivan J. Lankford,
By Hofgren, Wegner, Allen,
Stellman & McCord Attys.

United States Patent Office 3,507,259
Patented Apr. 21, 1970

3,507,259
REMOTE STARTER FOR AUTOMOTIVE VEHICLES
Ivan J. Lankford, Hoffman Estates, Ill., assignor to Peerless Instrument Co., a corporation of Illinois
Filed Aug. 5, 1968, Ser. No. 750,154
Int. Cl. F02m *17/00;* E05b *15/00;* G05g *1/04*
U.S. Cl. 123—179                                    10 Claims

ABSTRACT OF THE DISCLOSURE

A device having a thumbscrew adapted to be secured to the ignition key of an automotive vehicle and a lever portion to which a flexible cord is connected. The lever is arranged to permit the cord to be used to turn the key in the ignition switch from a remote position such as adjacent the engine as for facilitated servicing of the engine.

BACKGROUND OF THE INVENTION

Field of the invention

This invention relates to means for starting automotive vehicles and in particular means for permitting remote starting thereof.

Description of the prior art

In servicing automotive vehicles such as automobiles, the mechanic often requires the starting of the engine while working thereon. Heretofore, such remote starting has been effected by means of an accessory control switch which is connected in parallel with the automobile starting switch. The accessory switch is a normally open switch which is electrically connected from the positive terminal of the battery to the starter solenoid coil so that upon closing of the switch, the starter motor is energized.

A problem has arisen in recent years in connection with the use of such an accessory switch. More specifically, the use of cable and plug type wiring of automobile engines has made the terminals of the solenoid coil physically inaccessible, or relatively difficult to locate and connect to.

SUMMARY OF THE INVENTION

The present invention comprehends an improved remote starting device for automobiles, and the like, eliminating the disadvantages of the above discussed conventional accessory switch devices. The present invention comprehends the provision of a lever provided with means for removably connecting the lever to the ignition key. The lever is arranged so that when the key is inserted in the conventional ignition switch, a cord attached to another portion of the lever may be pulled to turn the key suitably to start the engine. The cord is made to be sufficiently long so that the pull thereon may be effected from such remote locations as adjacent the engine on either side of the automobile. The cord may be extended through a window of the automobile.

More specifically, the invention comprehends the provision of a means for remotely energizing the starter motor of an automobile which has a rotatable ignition switch for controlling the energization of the starter motor and a key having a control portion receivable in the ignition switch for operating the switch to energize the motor when the key is turned therein. The remote energizing means includes a lever, means on the lever for fixedly connecting one portion thereof to a manipulating portion of the key, and flexible cord means connected to the lever at a second portion spaced from the axis of rotation of the key for turning the key about the axis as an incident of the application of a tension force on the flexible means directed away from the lever and in a plane parallel to the axis. The means for securing the lever to the key comprises a thumbscrew cooperating with a bifurcated end of the lever for receiving the key therein and releaseably locking the lever to the key. The lever is turned so as to permit the cord to be extended across the flatwise extent of the key from one side thereof whereby the portion of the lever to which the cord is connected is urged toward the flatwise plane against the spring return of the ignition switch. The flexible cord may be connected to the lever by a suitable link for improved pivotal connection therebetween.

BRIEF DESCRIPTION OF THE DRAWING

Other features and advantages of the invention will be apparent from the following description taken in connection with the accompanying drawings wherein:

FIGURE 1 is a fragmentary perspective view of an automobile having a remote starting means embodying the invention;

FIGURE 2 is a fragmentary elevation of the remote starting means connected to the ignition key in the ignition switch of the automobile;

FIGURE 3 is a fragmentary enlarged perspective view thereof; and

FIGURE 4 is a fragmentary top plan view thereof.

DESCRIPTION OF THE PREFERRED EMBODIMENT

In the exemplary embodiment of the invention as disclosed in the drawing, an automotive vehicle, generally designated 10, herein a conventional automobile, having an engine, generally designated 11, provided with a starting motor 12 and a battery 13. As shown in FIGURE 2, the automobile 10 further includes a conventional dash 14 in which is provided an ignition switch 15 for controlling the energization of the starting motor 12 from the battery 13. The ignition system of such automobiles is well known to those skilled in the art and requires no further description herein other than to point out that the ignition switch 15 comprises a conventional ignition switch which is spring biased to the "Off" position of FIGURE 3. In the "Off" position, the ignition key 16 is disposed with the flatwise extent thereof in a vertical plane, as shown in FIGURE 3. More specifically, the key 16 includes a control portion 17 removably receivable in the ignition switch 15 and a manipulating portion 18 which is disposed outwardly of the ignition switch when the control portion is fully received therein.

As discussed briefly above, the invention comprehends the provision of an improved remote starting device, generally designated 19, which is adapted for use with the ignition key 16 to effect a starting of the engine 11 from a remote position such as at the righthand side of the engine in the area generally designated 20, as well as at the lefthand side of the engine in the area designated 21.

The remote control device 19 includes a lever 22 having a bifurcated end 23, one leg 23a of which is provided with a threaded end 24 in which is threadedly received a thumbscrew 25. The shank 26 of the thumbscrew is threadedly advanceable to engage the manipulating portion 18 of the ignition key disposed within the bifurcated end 23, as shown in FIGURE 3, to releasably lock the lever 22 to the key 16.

As further shown in FIGURE 3, the lever includes a first portion 27 extending outwardly from the bifurcated end 23 and a distal end portion 28 connected to the portion 27 by a turned midportion 29. The distal end 28 is provided with a hole 30 in which is pivotally fitted an S-link 31. A flexible cord 32 is provided with an end 33 secured to the link 31. The cord may have a substantial length permitting the extension thereof from the lever end 28 to the area 20, as shown in FIGURE 1. Illustratively, the cord may have a length of approximately 8 to 10 feet and may be formed of plastic for resistance to grease and oil, as may be deposited thereon in the running thereof over the engine parts.

The distal end of the cord 33 may be provided with a loop for facilitated manipulation, as shown in FIGURE 1.

As best seen in FIGURE 4, the flatwise plane 34 of the key 16 bisects the bifurcated portion 23 of the lever. The turned portion 29 disposes the distal end 28 substantially at an angle to the plane 34 so that the cord 32 cuts through the plane from the far side thereof. The axis of rotation 35 of the key 16 lies in the plane 34 and thus, the direction of the tension in cord 32 lies on a line 36 crossing the plane 34 which defines a plane parallel to the axis of rotation 35 of the key 16. As shown, line 36 may be substantially perpendicular to plane 34. Resultingly, the key 16 is turned about the axis 35 by the tension force in the cord 32 against the spring bias of the switch 15 to energize the starter motor 12 remotely, as desired. Release of the tension on the cord 32 permits the spring biased switch 15 to return the key to the "Off" position of FIGURE 3. The key need be turned only a small angular amount to effect the starting operation and thus, the pull direction is generally constant.

The connection of the lever to the key may be effected before the key is inserted in the ignition switch. The control portion 17 of the key 16 may then be inserted in the ignition switch 15 in the normal manner and the cord 32 run out through a window, such as window 37, shown in FIGURE 1. The cord is then available for use at the desired location.

The lever may be formed of a strong material such as extruded aluminum, or the like, with the turned portion 29 being formed as by twisting. The end portion 28 may be provided at an angle of approximately 45° to the portion 27. As shown in FIGURE 4, both legs of the bifurcated portion 23 may be provided with coaxially aligned threaded holes.

Thus, the remote starting device 19 provides an improved, easily connected means for starting the automobile engine from areas remote to the dash 14. The device 19 provides for facilitated work on the engine, such as performing compression tests, setting valve clearances, setting ignition points, and the like, and provides improved facility in eliminating the difficult connection of the conventional electrical control switches to the starter solenoid terminals.

While I have shown and described one embodiment of my invention, it is to be understood that it is capable of many modifications. Changes, therefore, in the construction and arrangement may be made without departing from the spirit and scope of the invention as defined in the appened claims.

I claim:
1. For use with an automobile having a starter motor, a rotatable ignition switch for controlling energizing of the starter motor, and a key having a control portion receivable in said ignition switch for operating the switch to energize said motor when said key is turned therein, and a manipulating portion movably exposed outwardly of said ignition switch when said control portion is received therein, means for remotely energizing the starter motor comprising:
   a lever;
   means on the lever for fixedly connecting one portion of the lever to said manipulating portion of the key; and
   flexible means connected to the lever at a second portion spaced from the axis of rotation of the key for turning the key about said axis as an incident of the application of a tension force on said flexible means directed away from said lever and in a plane parallel to said axis.

2. The remotely energizing means of claim 1 wherein said manipulating portion of the key is flat and said second portion of the lever is spaced from the flatwise plane of said manipulating portion when said first portion of the lever is connected thereto.

3. The remotely energizing means of claim 2 wherein said flexible element extends across said flatwise plane.

4. The remotely energizing means of claim 2 wherein said flexible element extends substantially perpendicularly across said flatwise plane.

5. The remotely energizing means of claim 1 wherein said connecting means on the lever comprises a thumbscrew threadedly carried on said one portion of the lever adapted to engage the manipulating portion of the key.

6. The remotely energizing means of claim 1 wherein said flexible means comprises a cord.

7. The remotely energizing means of claim 1 wherein said one portion of the lever is bifurcated to receive said manipulating portion of the key therein.

8. The remotely energizing means of claim 1 wherein said lever includes a turned portion connecting said second portion to said one portion.

9. The remotely energizing means of claim 1 wherein said flexible means is connected to said lever by means pivotable about an axis parallel to said key axis.

10. The remotely energizing means of claim 1 wherein said lever includes a bifurcated end defining said one portion and a thumbscrew threaded in said end, a turned portion extending from said one portion, and a distal end defining said second portion, said flexible means comprises a cord, said cord is connected to said lever distal end by a connecting link pivotally carried on said distal end.

References Cited
UNITED STATES PATENTS

| | | | |
|---|---|---|---|
| 2,078,293 | 4/1937 | Smith et al. | 70—456 |
| 2,466,820 | 4/1949 | Oberschmidt | 200—161 XR |
| 2,591,618 | 4/1952 | Schaeffer. | |
| 2,726,303 | 12/1955 | Berndsen. | |
| 2,924,961 | 2/1960 | Pyper | 70—456 |

MARK NEWMAN, Primary Examiner

A. D. HERRMANN, Assistant Examiner

U.S. Cl. X.R.

70—444; 74—544; 307—10; 123—198; 180—1; 200—161; 24—73